United States Patent
Zhang et al.

(10) Patent No.: US 8,094,761 B2
(45) Date of Patent: Jan. 10, 2012

(54) UPLINK FEEDBACK FOR SUPPORTING MIMO OPERATION IN THE LTE DOWNLINK (75) Inventors: Jianzhong Zhang, Irving, TX (US); Juho Lee, Suwon-si (KR); Farooq Khan, Allen, TX (US); Zhouyue Pi, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 750 days.

(21) Appl. No.: 12/285,095

(22) Filed: Sep. 29, 2008

(65) Prior Publication Data
US 2009/0147865 A1 Jun. 11, 2009

Related U.S. Application Data (60) Provisional application No. 60/996,858, filed on Dec. 7, 2007, provisional application No. 61/136,389, filed on Sep. 2, 2008.

(51) Int. Cl.
H03D 1/04 (2006.01)
H03D 1/06 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl. ........ 375/346; 375/260; 375/340; 375/285; 375/227; 375/252; 455/63.1; 455/226.1; 455/226.2; 455/226.3

(58) Field of Classification Search .................. 375/346, 375/260, 340, 285, 227; 455/63.1, 226.1–226.3; 370/252
See application file for complete search history.

(56) References Cited

U.S. PATENT DOCUMENTS

| 7,885,202 | B2* | 2/2011 | Li et al. ......................... 370/252 |
| 7,933,287 | B2* | 4/2011 | Toda et al. .................... 370/437 |
| 7,940,851 | B2* | 5/2011 | Duan et al. ................... 375/260 |
| 7,961,700 | B2* | 6/2011 | Malladi et al. ................ 370/345 |
| 7,965,649 | B2* | 6/2011 | Tee et al. ....................... 370/252 |
| 7,983,351 | B2* | 7/2011 | Motoyoshi et al. ........... 375/260 |
| 7,986,612 | B2* | 7/2011 | Duan et al. .................... 370/206 |
| 2005/0128993 | A1* | 6/2005 | Yu et al. ......................... 370/342 |
| 2006/0274712 | A1 | 12/2006 | Malladi et al. |
| 2006/0285585 | A1 | 12/2006 | Sampath |
| 2007/0026808 | A1 | 2/2007 | Love et al. |
| 2007/0105503 | A1* | 5/2007 | Kim .............................. 455/70 |
| 2007/0258366 | A1 | 11/2007 | Imamura |

OTHER PUBLICATIONS

Notification of Transmittal of the International Search Report and the Written Opinion of the International Searching Authority, or the Declaration dated Jul. 29, 2009 in connection with PCT Application No. PCT/KR2008/007216.

* cited by examiner

Primary Examiner — Phuong Phu (57) ABSTRACT

A quantization method of transmission of channel quality information (CQI) includes measuring two measurements SINRs and calculating a difference (i.e., Delta SINR) between the two measurements of the SINRs; determining a $CQI_{base}$ (base channel quality information) based on one of the two measurements SINRs and a known quantization table for the $CQI_{base}$, and simultaneously receiving cell-specific or UE-specific parameters transmitted from a base station and configuring a quantization table defining a mapping method of $CQI_{delta}$ (delta channel quality information) and the Delta SINR and determining the $CQI_{delta}$ based on the obtained Delta SINR and the configured quantization table; and transmitting the resulting $CQI_{delta}$ and $CQI_{base}$.

19 Claims, 4 Drawing Sheets

UPLINK FEEDBACK FOR SUPPORTING MIMO OPERATION IN THE LTE DOWNLINK

CLAIM OF PRIORITY

This application makes reference to, incorporates the same herein, and claims all benefits accruing under 35 U.S.C. §119 from an application earlier filed in the U.S. Patent & Trademark Office on 7 Dec. 2007 and there duly assigned Ser. No. 60/996,858.

BACKGROUND OF THE INVENTION

1. Field of the Invention

The present invention relates to a method of transmission of channel quality information (CQI) and apparatus for utilizing such method in a Multiple Input Multiple Output (MIMO) system, and more specifically, to a quantization method of transmission of channel quality information (CQI) based on values of codewords, and apparatus for utilizing such method in the Multiple Input Multiple Output (MIMO) system.

2. Description of the Related Art

In an Orthogonal Frequency Division Multiplexing (OFDM) system, data may be transmitted by a transmitter and received by a receiver. At the transmitter, the input data may be sequentially processed by a quadrature amplitude modulation (QAM) modulator, a serial-to-parallel convertor, an inverse fast Fourier transform (IFFT) unit, and a parallel-to-serial convertor and a cyclic prefix (CP) inserter. The resulting sequence of samples is referred to as OFDM symbol. At the receiver, the transmitted data from the transmitter is sequentially processed by a cyclic prefix remover, a parallel-to-serial convertor, a fast Fourier transform (FFT) transformer, a parallel-to-serial convertor and a QAM demodulator. And therefore, the transmitted data may be recovered at the receiver.

Multiple Input Multiple Output (MIMO) schemes use multiple transmitting antennas and multiple receiving antennas in order to improve the capacity and reliability of a wireless communication channel. A MIMO system promises linear capacity with K where K is the minimum of number of transmitting antennas (M) at transmitter and receiving antennas (N) at receiver. As one example, four different data streams Data Streams are transmitted separately from the four transmitting antennas. The transmitted signals are received at four receiving antennas. Spatial signal processing may be performed on the received signals by a spatial signal processor in order to recover the four received data streams.

In the contemporary specifications of the LTE (long term evolution), codewords may be employed and mapped to up to four data transmission layers in the MIMO transmission.

As an example, in a four by four MIMO system, two codewords may be employed. The feedback of channel quality information (CQI) in the case of two-codeword MIMO transmission has been discussed in several 3GPP (third Generation Partnership Project) RAN1 contributions. An employment of $CQI_{base}$ and $CQI_{delta}$ in the feedback of CQI is the preferred approach in the contemporary LTE, because it may reduce the feedback overhead in the uplink by assigning fewer feedback bits for $CQI_{delta}$ than for $CQI_{base}$. Here, $CQI_{base}$ is one of the two CQIs respectively defined for one of the two codewords respectively defined for each data transmission layer, and $CQI_{delta}$ is a difference between the two CQIs.

Recent research, however, discovers that the performance loss of the above stated "$CQI_{base}+CQI_{delta}$" scenario may lead to potential performance loss in certain scenarios where the dynamic range of the $CQI_{delta}$ may vary significantly in different configurations and channel situations. Therefore, the contemporary scenario of "$CQI_{base}+CQI_{delta}$" has a limited compression potential.

SUMMARY OF THE INVENTION

It is therefore one object of the present invention to provide an improved method of transmission of channel quality information (CQI) and apparatus for utilizing such method in a Multiple Input Multiple Output (MIMO) system in order to solve the above stated problems.

It is another object of the present invention to provide a quantization method of transmission of channel quality information (CQI) corresponding to certain values measured on codewords, and apparatus for utilizing such method in a Multiple Input Multiple Output (MIMO) system.

In a two-codeword MIMO system, $CQI_{base}$ and $CQI_{delta}$ are obtained by quantizing the measured value made on the two codewords in the MIMO transmission. Possible measured values made on the codewords include effective SINR (signal to interference plus noise ratio), i.e., EESM (exponential effective signal SIR/SNR Mapping), modulation-constrained mutual information, and other related values. SINR1 and SINR2, which are observed at the user equipment (UE), are respectively denoted as the values made on two distinct codewords.

Configurable step size $u_S$ for small/zero delay CDD precoding schemes and configurable step size $u_L$ for large delay CDD schemes for quantization of the $CQI_{delta}$ may be determined either according to the antenna configuration (such as antenna spacing) of a cell including E-NodeB (base station) and corresponding UEs, or according to the channel condition of a given UE. Here, configurable offset $o_S$ may be defined for small/zero delay CDD preceding schemes and $o_L$ may be defined for large delay CDD schemes. The value of step sizes $u_S$ and $u_L$ may have a predetermined relationship. For example, step size $u_S$ may be equal to step size, or step size $u_S$ may be two times greater than step size $u_L$. Some or all of variables $u_S$ and $u_L$ may be configured in a cell-specific fashion, and are carried and transmitted by one of the E-NodeB (i.e., eNB) broadcast messages.

Some or all of variables $u_S$ and $u_L$ may be configured in a UE-specific fashion, and are carried and transmitted by one of the higher-layer messages transmitted from e-NodeB to a UE semi-statically using, for example, a radio resource control (RRC) message.

Some or all of variables $o_S$ and $o_L$ may be configured in a UE-specific fashion, and are carried and transmitted by one of the higher-layer messages transmitted from e-NodeB to a UE semi-statically using, for example, a radio resource control (RRC) message.

At the UE side, the UE may receive these cell-specific or UE-specific variables mentioned above, construct proper quantization tables for $CQI_{delta}$, and then report $CQI_{delta}$ and $CQI_{base}$ to the E-NodeB. Here, the quantization table for $CQI_{base}$ is known.

The quantization procedural steps includes that firstly, the UE measures SINRs respectively on two codewords and thus obtains SINR1 and calculates delta SINR (i.e., (SINR2-SINR1)); secondly, the UE performs the quantization of $CQI_{base}$ calculating the $CQI_{base}$ based on the measured SINR1 and a known quantization table for $CQI_{base}$, and the UE simultaneously receives the cell-specific or UE-specific parameters transmitted from the E-NodeB and configures a quantization table for $CQI_{delta}$ and performs the quantization of $CQI_{delta}$ by calculating the $CQI_{delta}$ based on the calculated delta SINR and configured quantization table for $CQI_{delta}$; and thirdly, the UE reports $CQI_{delta}$ and $CQI_{base}$ to the E-NodeB.

On the other hand, the E-NodeB receives $CQI_{base}$ and $CQI_{delta}$ from the UE feedback in the uplink channel, and the E-NodeB performs the reversed operation compared to the UE and looks up the quantization tables in order to figure out the quantized SINR1 and the quantized Delta SINR (SINR2-SINR1).

In order to fully define the mapping between $CQI_{delta}$ and the quantized delta SINR (SINR2-SINR1) value, a predetermined quantization table between $CQI_{delta}$ and an intermediate variable denoted by c is firstly constructed. In the uniform mapping example, the step size of the variable c is constant while the value of $CQI_{delta}$ increases. In one example of the non-uniform mappings, the step size in the variable c may be less in the middle portion of the table (i.e., the portion where $CQI_{delta}$ has mediate values among all of the available values) and greater towards the two ending portions (i.e., the portions where $CQI_{delta}$ has either greater values or less values compared to the mediate values among all of the available values). In another example of the non-uniform mappings, the step size in the variable c increases while the value of $CQI_{delta}$ increases.

The value of Delta SINR (SINR2-SINR1) may be given by the following expressions: for small-delay or zero-delay CDD preceding, $$o_S + c \cdot u_S \text{ (dB); and}$$

for large-delay CDD precoding, $$o_L + c \cdot u_L \text{ (dB)}$$

where $o_S$ and $o_L$ refer to configurable offsets respectively for small-delay or zero-delay CDD preceding and large-delay CDD preceding, $u_S$ and $u_L$ refer to configurable steps respectively for small-delay or zero-delay CDD precoding and large-delay CDD preceding, and c is intermediate variable as stated above.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Six references as listed below are referred to and incorporated by reference into this application for the present invention:

[1] R1-072038, "UL Control Signaling in Support of DL SIMO and 2×2 SU-MIMO Users", Qualcomm Europe, 3GPP TSG RAN WG1#49, Kobe, Japan, May 7-11, 2007;

[2] R1-072213, "Design Aspects of MIMO-Related UE Feedback", Texas Instruments, 3GPP TSG RAN WG1#49, Kobe, Japan, May 7-11, 2007;

[3] R1-073489, "Delta CQI in spatial domain for SU-MIMO", LG Electronics, 3GPP TSG RAN WG1#50, Athens, Greece, Aug. 20-24, 2007;

[4] R1-074655, "Limitations of CQI Compression for Dual Codeword MIMO", Alcatel-Lucent, RAN1#51, Jeju, Korea, November 2007;

[5] R1-072001, 3GPP, "Draft Report of 3GPP TSG RAN WG1#48b v0.3.0", Kobe, Japan, 7-11 May, 2007; and

[6] 3GPP TS36.21 1. v8.0.0. "EUTRA: Physical Channels and Modulation", September 2007.

Figure 1:
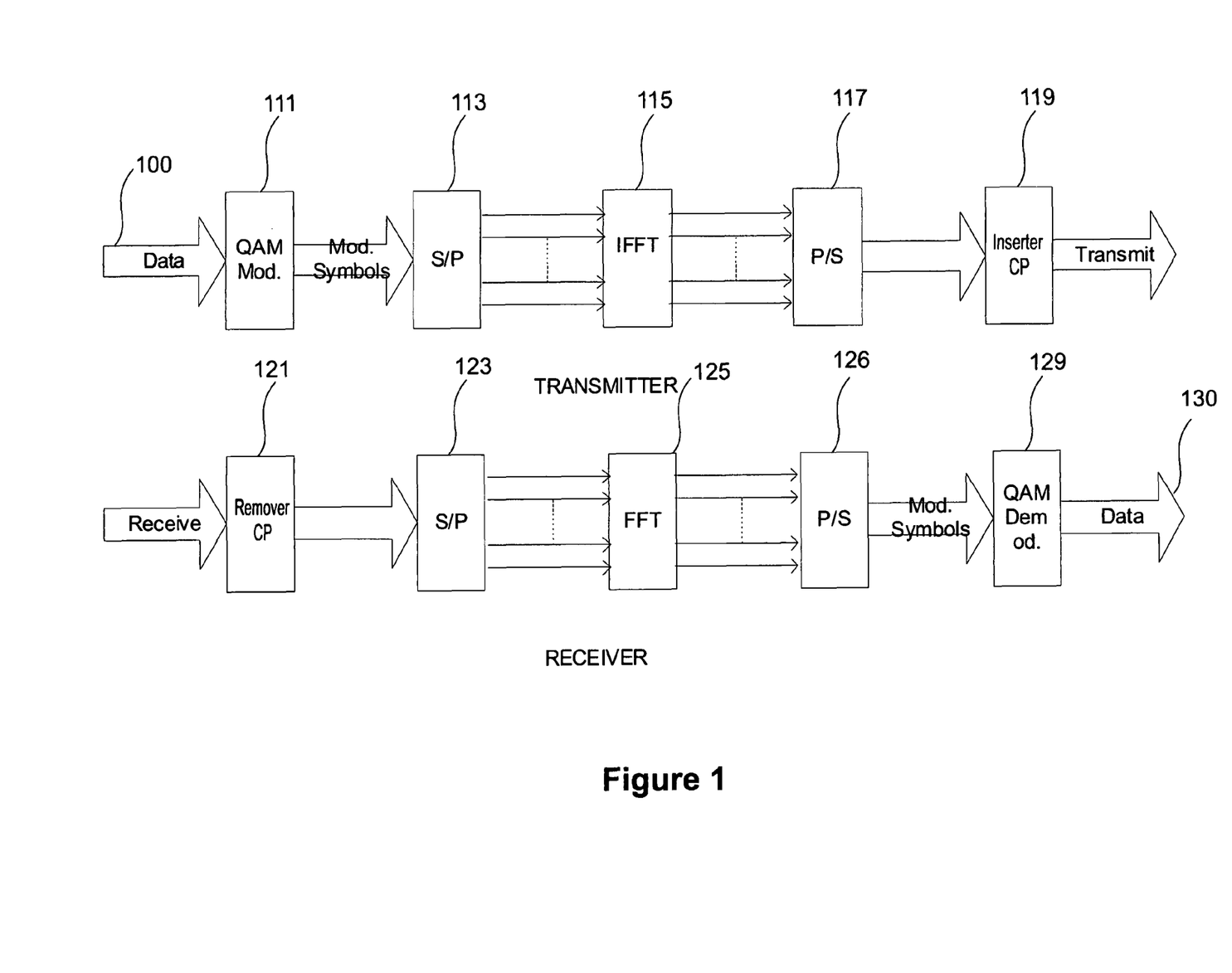
FIG. 1 shows a simplified example of data transmission/reception using Orthogonal Frequency Division Multiplexing (OFDM)

OFDM is a technology of multiplexing data in a frequency domain. Modulation symbols are carried by sub-carriers in a frequency demain. A simplified example of data transmission/reception using Orthogonal Frequency Division Multiplexing (OFDM) is shown in FIG. 1. At a transmitter, data 100 to be transmitted is modulated by a quadrature amplitude modulation (QAM) modulator 111. The QAM modulated symbols are serial-to-parallel converted by a serial-to-parallel convertor 113. The QAM modulated symbols are serial-to-parallel converted by a serial-to-parallel convertor 113 and input to an inverse fast Fourier transform (IFFT) unit 115. At the output of IFFT unit 115, a number of N time-domain samples are obtained and N refers to the sampling number of IFFT/FFT used by the OFDM system. Signal output from IFFT unit 115 is parallel-to-serial converted by a parallel-to-serial convertor 117 and a cyclic prefix (CP) is added to the signal sequence by a CP inserter 119. The resulting sequence of samples is referred to as OFDM symbol. At a receiver, the cyclic prefix is firstly removed by cyclic prefix remover 121 from the received OFDM symbols, and the output signal from cyclic prefix remover 121 is serial-to-parallel converted by parallel-to-serial convertor 123 before feeding the converted parallel signal into fast Fourier transform (FFT) transformer 125. Output of FFT 125 is parallel-to-serial converted by parallel-to-serial convertor 127 and the resulting output is input to the QAM demodulator 129. Therefore, the transmitted data is recovered at the receiver. The data is therefore transmitted by the transmitter and received by the receiver by using the Orthogonal Frequency Division Multiplexing (OFDM).

The total bandwidth in an OFDM system may be divided into narrowband frequency units which are called subcarriers. The number of subcarriers is equal to N which is size of the FFT/IFFT used in the system. Generally, the number of subcarriers used for data is less than N because some subcarriers at the edge of the frequency spectrum are reserved as guard subcarriers, and no information is transmitted on the guard subcarriers.

Figure 2:
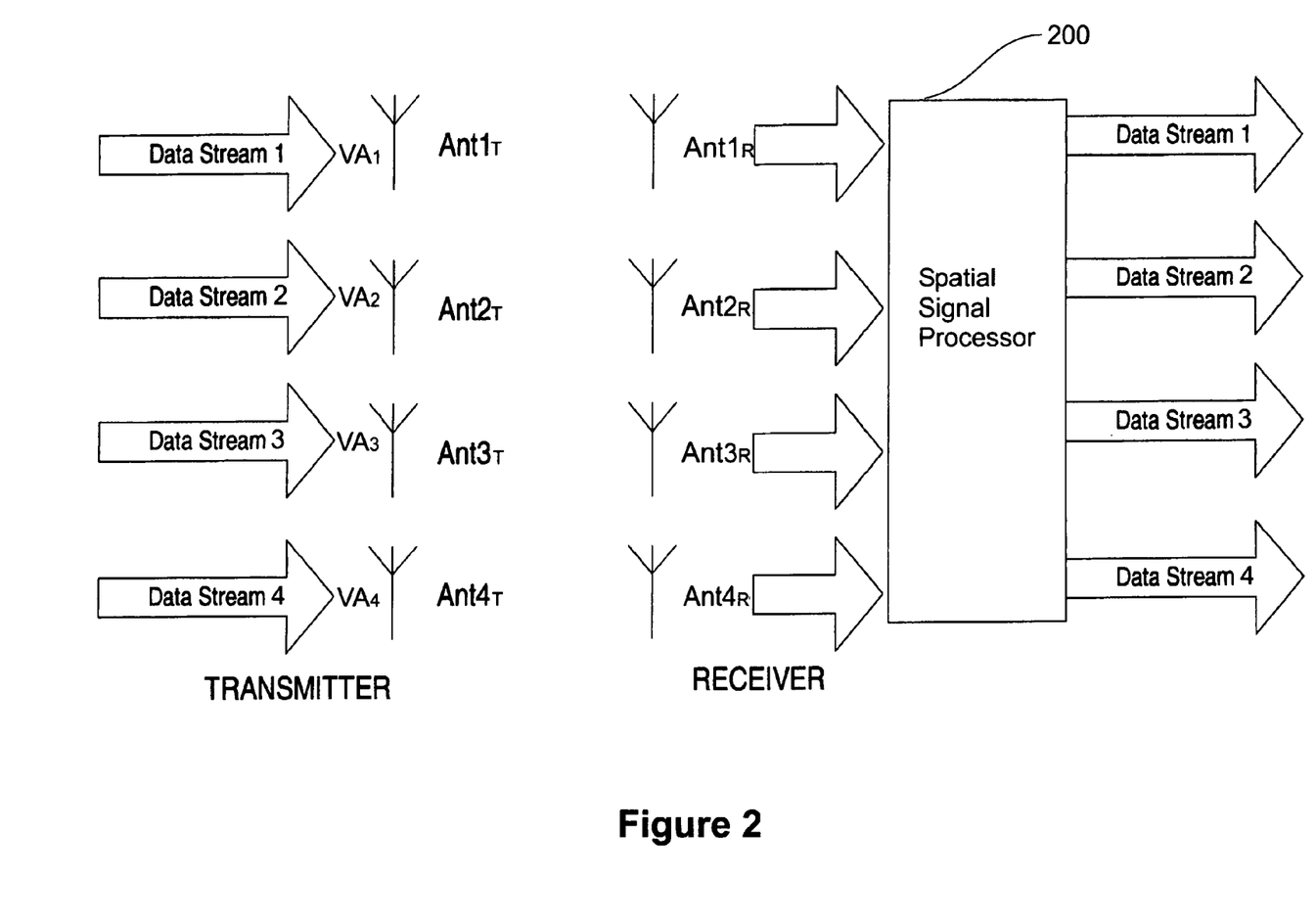
FIG. 2 shows a simplified example of a 4×4 Multiple Input Multiple Output (MIMO) system.

Turning now to FIG. 2, Multiple Input Multiple Output (MIMO) schemes use multiple transmitting antennas and multiple receiving antennas in order to improve the capacity and reliability of a wireless communication channel. A MIMO system promises linear capacity with K where K is the minimum of number of transmitting antennas (M) at transmitter and receiving antennas (N) at receiver, i.e., K=min(M, N). FIG. 2 shows a simplified example of a 4×4 Multiple Input Multiple Output (MIMO) system. In this example, four different data streams Data Streams 1 to 4 are transmitted separately from the four transmit antennas $Ant1_T$ to $Ant4_T$. The transmitted signals are received at four receiving antennas $Ant1_R$ to $Ant4_R$. Spatial signal processing is performed on the received signals by spatial signal processor 200 in order to recover the four transmitted data streams. An example of spatial signal processing is V-BLAST which uses the successive interference cancellation (SIC) principle to recover the transmitted data streams. Other variants of MIMO schemes include schemes that perform some kind of space-time coding across the transmitting antennas (e.g. D-BLAST) and also beamforming schemes such as Spatial Division multiple Access (SDMA). One data stream corresponds to one data layer and therefore multiple data streams are corresponding to multiple data layers respectively.

In the current specifications of LTE (long term evolution) as defined in on page 26 of reference [6], codewords may be mapped to up to four data transmission layers in the MIMO transmission. The following is excerpt of section 6.3.3.2 of reference [6].

"6.3.3.2 Layer Mapping for Spatial Multiplexing

For spatial multiplexing, the layer mapping shall be done according to Table 6.3.3.2-1. The number of layers v is less than or equal to the number of antenna ports P used for transmission of the physical channel."

Reference [6], on page 26, also provided Table 6.3.3.2-1 showing a mapping method between codewords and layers for the spatial multiplexing. In Table 6.3.3.2-1 as cited below, complex-valued modulation symbols $d^{(q)}(0), \ldots, d^{(q)}(M_{symb}^{(q)}-1)$ for a code word q are mapped onto the data transmission layers $x(i)=[x^{(0)}(i) \ldots x^{(v-1)}(i)]^T$, where q refers the index of codewords, $d^{(q)}(i)$, i.e., $d^{(q)}(0), \ldots, d^{(q)}(M_{symb}^{(q)}-1)$ are complex-valued modulation symbols; $M_{symb}^{layer}$ is the number of modulation symbols of each layer; $x(i)=[x^{(0)}(i) \ldots x^{(v-1)}(i)]^T$ refers to data transmission layers where u refers to the total number of data transmission layers. Here, four data transmission layers respectively correspond to complex-value modulation symbols of two code words.

TABLE 6.3.3.2-1

Codeword-to-layer mapping for spatial multiplexing

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |

The feedback of channel quality information (CQI) in the case of two codeword MIMO transmission has been discussed in several 3GPP RAN1 contributions, such as references [1]-[3]. For example, reference [2] stated that the CQI may be fed back every N sub-frames where N is configured by the Node-B or network depending on the channel condition and/or deployment scenario. Per the agreement in reference [5], the CQI is defined per MIMO codeword with a maximum of two (2) CQIs corresponding to a maximum of two (2) codewords.

Reference [2], on pages 2-3, stated that:
"The CQI Definition Depends on the Transmission Rank:
For rank 1, only one (1) CQI is needed.
For rank $\geq 2$, two CQIs are needed, each associated with 1 codeword. The two CQIs can be:
 1. Two full CQIs corresponding to the two CWs: $CQI_1$ and $CQI_2$
 2. One full (base) CQI and one delta CQI: $CQI_{base}$ and $CQI_{delta}$, $CQI_{base}$ can be defined either as the CQI of the first codeword. Then, $CQI_{delta}$ is simply the difference between $CQI_{base}$ and the CQI of the other CW.

$CQI_{base} = CQI_1$ $CQI_{delta} = CQI_2 - CQI_1$ \hfill (1)

The CQIs are computed from the channel, noise variance, and/or interference estimates. Once computed, the CQIs are quantized. Due to the inherent correlation between $CQI_1$ and $CQI_2$, $CQI_{delta}$ requires fewer bits than $CQI_{base}$ since the dynamic range for $CQI_{delta}$ is smaller. Hence, employing delta CQI seems beneficial."

The second approach of $CQI_{base}$ and $CQI_{delta}$ as cited above is the preferred approach in references [1]-[3], because the second approach may reduce the feedback overhead in the uplink by assigning fewer feedback bits for $CQI_{delta}$ than for $CQI_{base}$.

In reference [4], however, the performance loss of this "$CQI_{base}+CQI_{delta}$" could lead to potential performance loss in some scenarios because the dynamic range of the $CQI_{delta}$ may vary significantly in different configurations and channel situations. It was analyzed, in reference [4], that:

"Introducing the delta CQI scheme yields benefits in terms of reduced signaling overhead at least in UL. On the other hand, there will be situations, in which the second CQI deviates more from the first CQI than the delta metric can cover. In this case a loss in throughput is unavoidable. So, the reduction in signaling overhead has to be weighed against the loss of throughput. Recent analysis provided . . . analyses of the performance of the delta CQI scheme in terms of statistics. A significant variability between different configurations and channel situations has been found. The delta CQI values probability density function has a quite consistent characteristic, which implies significant throughput losses. The results of some important scenarios reveal a very limited compression potential."

Noteworthy, as defined in reference [6], there are three preceding MIMO schemes that allow two-codeword transmission, namely zero CDD (cyclic delay diversity), small CDD and large delay CDD with spatial multiplexing. In large delay CDD systems, the $CQI_{delta}$ is always mapped a nonnegative value of a delta SINR (signal to interference plus noise ratio) in dB indicating the benefits of successive interference cancellation (SIC) for the codeword that is decoded last; on the other hand, in small or zero delay CDD systems, $CQI_{delta}$ may be mapped to either a positive value or a negative value of a delta SINR in dB.

As one of embodiments of the present invention, configurable quantization methods for $CQI_{delta}$ are proposed based on conditions such as different antenna configurations and channel conditions. One example of configuration CQI quantization method is a configurable CQI step size used for $CQI_{delta}$.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

In a two-codeword MIMO configuration, $CQI_{base}$ and $CQI_{delta}$ are obtained by quantizing the values measured on the two codewords in the MIMO transmission. Possible values measured on the codewords include effective SINR (signal to interference plus noise ratio), i.e., EESM (exponential effective signal SIR/SNR Mapping), modulation-constrained mutual information, and other related values. In the examples as shown in the present invention, effective SINR (or simply denoted as SINR) may be employed to illustrate the quantization process. The present invention however is not limited to the effective SINR but may be applied to other related values made on the codewords. SINR1 and SINR2, which are observed at the user equipment (UE), are respectively denoted as values measured on two codewords. The SINRs may be either wide-band SINRs averaged over several subbands in the frequency domain, or may be SINRs averaged only over a single subband. The delta SINR between these two SINRs may be given by (SINR2-SINR1). For example, the UE may quantize SINR1 to achieve $CQI_{base}$, and may quantize the difference (SINR2-SINR1) in order to obtain $CQI_{delta}$.

Figure 3:
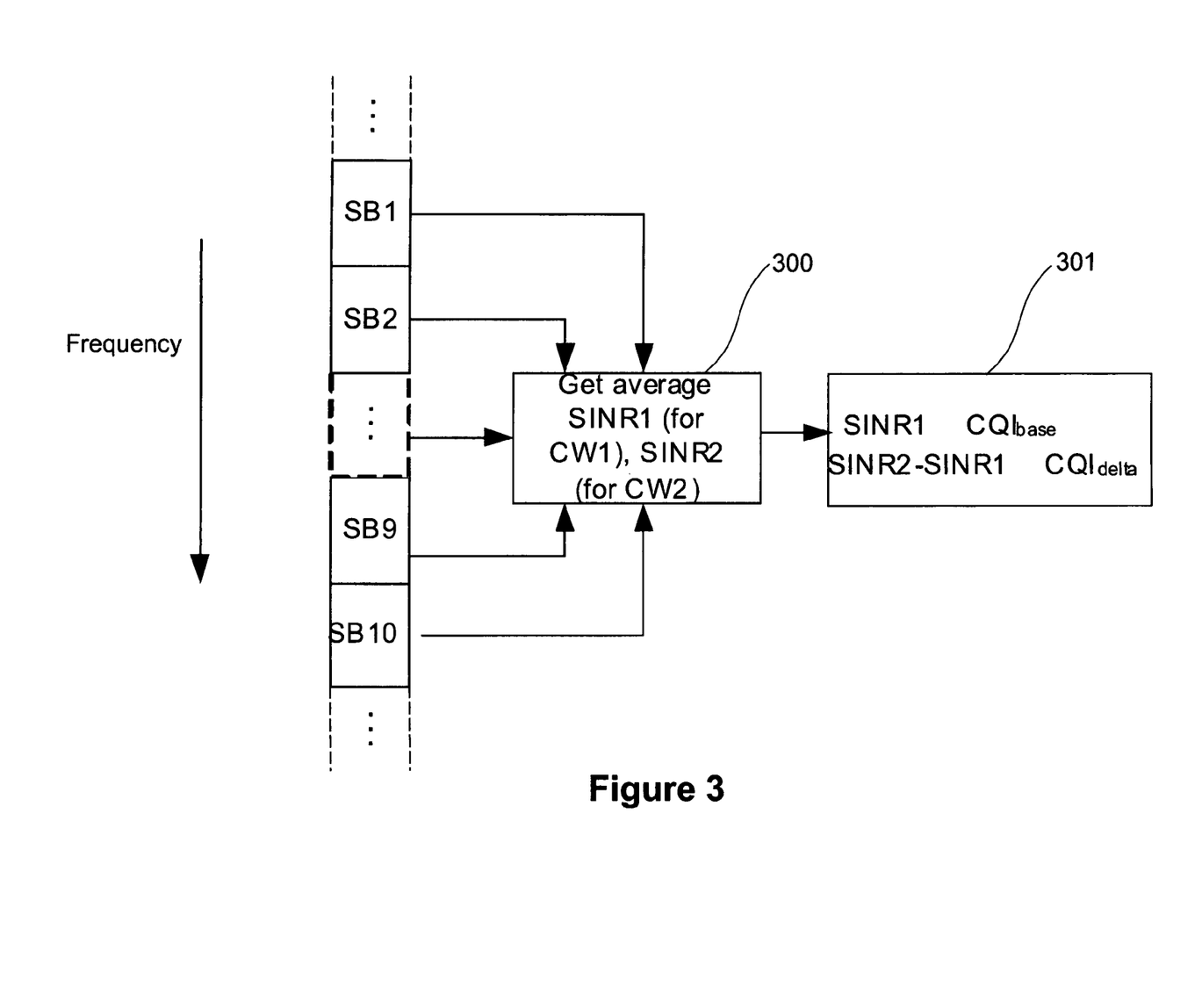
FIG. 3 shows an example of a procedure of obtaining a measurement of SINRs (signal to interference plus noise ratio) averaged over several subbands and obtaining the channel quality information (CQI) according to the obtained SINRs according to the principle of one embodiment of the present invention.

FIG. 3 shows an example of a procedure of obtaining a measurement of SINRs (signal to interference plus noise ratio) averaged over several subbands and obtaining the channel quality information (CQI) according to the obtained SINRs according to the principle of one embodiment of the present invention. As shown in FIG. 3, SB1, SB2, ..., and SB 10 are sampled subbands in the frequency domain. At step 200, for example, the UE obtains two averaged SINRs (i.e., SINR1 for one of the two codewords, and SINR2 for the other of the two codewords) either over several subbands (e.g., SB1, SB2, ..., and SB 10). At step 301, the UE then may quantize the obtained SINR1 in order to obtain $CQI_{base}$; and may quantize the delta SINR (i.e., (SINR2-SINR1)) in order to obtain $CQI_{delta}$.

In the following examples illustrating the principles of the embodiments of the present invention, $u_S$ refers to a configurable step size employed by the quantization of $CQI_{delta}$ for the small or zero delay CDD preceding schemes; and $u_L$ refers to a configurable step size employed by the quantization of $CQI_{delta}$ for the large delay CDD precoding schemes.

In one embodiment of the present invention, configurable quantization of $CQI_{delta}$ is proposed. In one example, configurable step size $u_S$ for small/zero delay CDD precoding schemes and configurable step size $u_L$ for large delay CDD schemes for quantization of the $CQI_{delta}$ may be determined either according to the antenna configuration (such as antenna spacing) of the cell, or according to the channel condition of a given UE. Here, configurable offset $o_S$ may be defined for small/zero delay CDD precoding schemes and $o_L$ may be defined for large delay CDD schemes. One of the benefits of the configurable quantization is that the supported dynamic range of the $CQI_{delta}$ may be more flexible by employing the configurable step sizes and configurable offsets. For example, if a larger dynamic range is needed, the E-NodeB may configure a set of larger step sizes $u_S$ and $u_L$; on the other hand, if a smaller dynamic range is needed, the E-NodeB may configure a set of smaller step sizes $u_S$ and $u_L$.

The value of step sizes $u_S$ and $u_L$ may have a predetermined relationship. For example, step size $u_S$ may be equal to step size $u_L$ (i.e., $u_S=u_L$), or step size $u_S$ may be two times greater than step size $u_L$ (i.e., $u_S=2\times u_L$). The relationship between the values of step sizes however is not limited to the above stated example. In this case, E-NodeB only needs to configure one of two step sizes, and the other step size may be automatically set based on the configured one of two step sizes.

In one example of this embodiment, some or all of variables $u_S$ and $u_L$ may be configured in a cell-specific fashion, and are carried and transmitted by one of the E-NodeB (i.e., eNB) broadcast messages. These broadcast messages can be communicated to all the UEs within the cell on either Primary broadcast (PBCH) or Dynamic Broadcast (D-BCH) channels. In another example of this embodiment, some or all of variables $u_S$ and $u_L$ are configured in a UE-specific fashion, and are carried and transmitted by one of the higher-layer messages transmitted from E-NodeB to a UE semi-statically by using, for example, a radio resource control (RRC) message. In other words, the RRC message is transmitted from eNB to UE, to configure these two parameters in a semi-static fashion.

In one example of this embodiment, some or all of variables $o_S$ and $o_L$ may be configured in a cell-specific fashion, and are carried and transmitted by one of the E-NodeB (i.e., eNB) broadcast messages. These broadcast messages can be communicated to all the UEs within the cell on either Primary broadcast (PBCH) or Dynamic Broadcast (D-BCH) channels. In another example of this embodiment, some or all of variables $o_S$ and $o_L$ are configured in a UE-specific fashion, and are carried and transmitted by one of the higher-layer messages transmitted from E-NodeB to a UE semi-statically using, for example, a radio resource control (RRC) message.

At the UE side, the UE may receive these cell-specific or UE-specific parameters mentioned above, construct proper quantization tables for $CQI_{delta}$, and then report $CQI_{delta}$ and $CQI_{base}$ to the E-NodeB. Here, the quantization table for $CQI_{base}$ is known.

Figure 4:
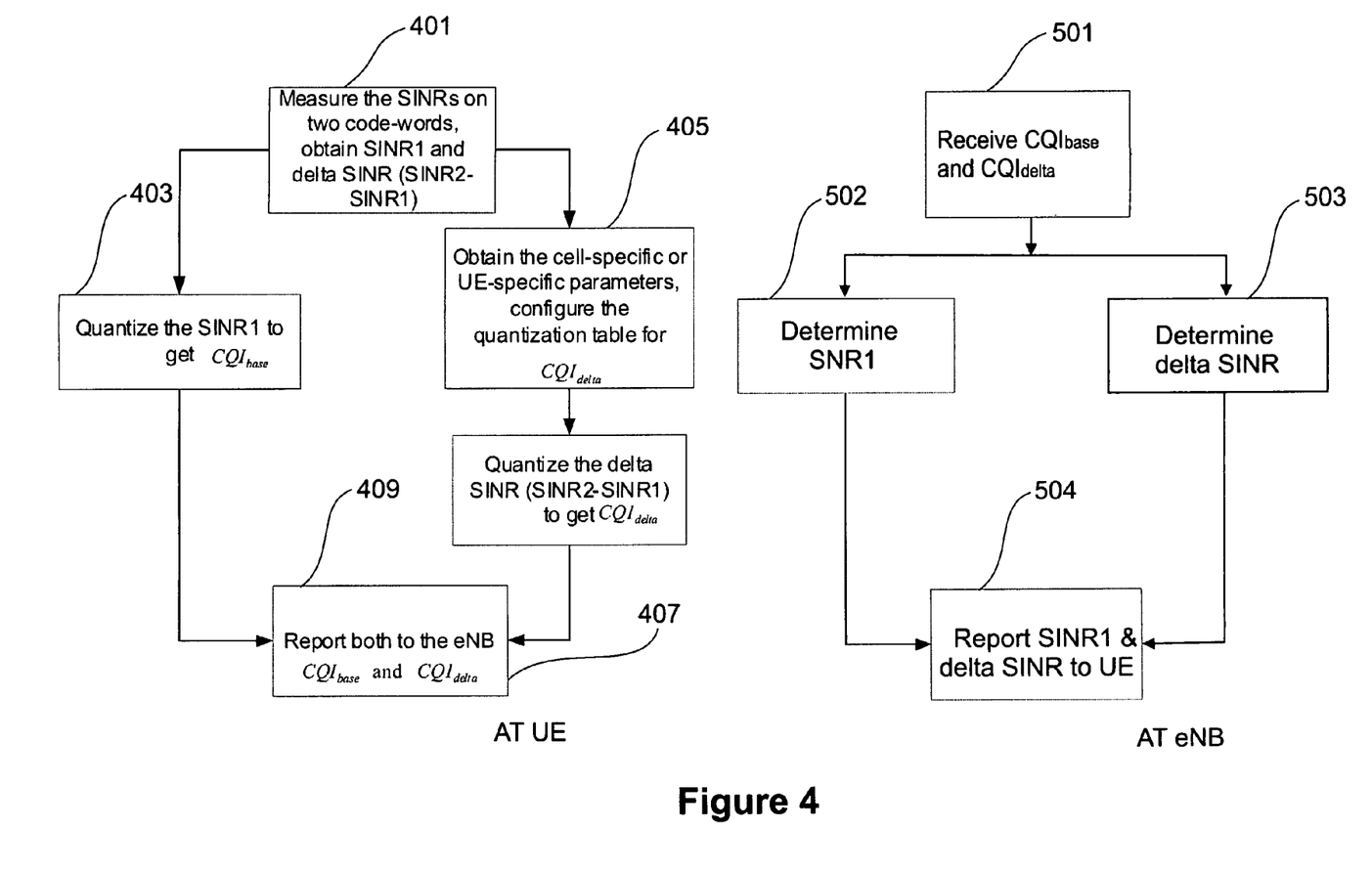
FIG. 4 is flow charts illustrating processes of the quantization of $CQI_{delta}$ and $CQI_{base}$ according to the principle of one embodiment of the present invention.

FIG. 4 is flow charts illustrating processes of the quantization of $CQI_{delta}$ and $CQI_{base}$ according to the principle of one embodiment of the present invention. At step 401, the UE measures the SINRs respectively for two codewords and thus obtaining SINR1 and calculating delta SINR (i.e., (SINR2-SINR1)). At step 403, the UE performs the quantization of $CQI_{base}$ by obtaining the $CQI_{base}$ based on the measured SINR1 and a known quantization table defining a mapping method between the SINR1 and $CQI_{base}$. At step 405, the UE receives the cell-specific or UE-specific parameters transmitted from the E-NodeB and configures a quantization table for $CQI_{delta}$. At step 407, the UE performs the quantization of $CQI_{delta}$ by calculating the $CQI_{delta}$ based on the obtained delta SINR and configured quantization table for $CQI_{delta}$. At step 409, the UE report $CQI_{delta}$ and $CQI_{base}$ to the E-NodeB. The operations at UE side are used to generate the input data as marked in FIG. 1 at transmitter side.

On the other hand, the E-NodeB receives $CQI_{base}$ and $CQI_{delta}$ from the UE feedback in the uplink channel, and the E-NodeB performs the reversed operation and looks up the quantization tables to figure out the (quantized) SINR1 and Delta SINR (SINR2-SINR1). As show in FIG. 4, at step 501, the E-NodeB receives $CQI_{base}$ and $CQI_{delta}$ transmitted from the UE. At step 502 and 503, the E-NodeB respectively looks up the quantization tables for $CQI_{base}$ and $CQI_{delta}$, therefore respectively determines the SINR1 and delta SINR. At step 504, the E-NodeB transmits the determined SINR1 and delta SINR to the UE. The operations at eNodeB side are used to interpret the output data as marked in FIG. 1 at receiver side.

In order to fully define the mapping between $CQI_{delta}$ and the quantized delta SINR (SINR2-SINR1) value, a quantization table defining the mapping between $CQI_{delta}$ and an intermediate variable denoted by c is firstly constructed. As an example, a 3-bit quantization table is given as Table 1. Table 1 shows uniform and non-uniform examples of mappings between $CQI_{delta}$ and intermediate variable c. Table 1 includes one uniform and two non-uniform quantization examples. In the non-uniform example A of the table, the step size in the variable c is smaller in the middle portion of Table 1 (step size of variable c is 1), and larger towards the two ending portions (step size of variable is 2). Note that other forms of non-uniform quantization may also exist. In the non-uniform example B of the table, the step size in the variable c increases from 1 to 2 while the signaled valued in $CQI_{delta}$ increases.

TABLE 1

Uniform and non-uniform examples of quantization table for mappings between Delta CQI and intermediate variable c

| $CQI_{delta}$ | c (uniform) | c (non-uniform A) | c (non-uniform B) |
|---|---|---|---|
| 000 | 0 | 0 | 0 |
| 001 | 1 | 2 | 1 |
| 010 | 2 | 4 | 2 |
| 011 | 3 | 5 | 3 |
| 100 | 4 | 6 | 4 |
| 101 | 5 | 7 | 6 |
| 110 | 6 | 9 | 8 |
| 111 | 7 | 11 | 10 |

The final value (in dB) of Delta SINR (SINR2-SINR1) may be given by equations (2) and (3) as follow:
for small-delay or zero-delay CDD preceding, $$o_S + c \cdot u_S \text{ (dB)}; \quad (2)$$

and for large-delay CDD preceding, $$o_L + c \cdot u_L \text{ (dB)}, \quad (3)$$

where $o_S$ and $o_L$ refer to configurable offsets respectively for small-delay or zero-delay CDD precoding and large-delay CDD precoding, and $u_S$ and $u_L$ refer to configurable steps respectively for small-delay or zero-delay CDD precoding and large-delay CDD precoding.

Therefore, a one-to-to quantization table may be constructed between the Delta SINR and $CQI_{delta}$ based on Table 1 and equations (2), (3).

In order to clearly illustrate the principle of constructing the quantization tables according to the embodiments of the present invention, several examples as follows are provided.

EXAMPLES

1. Large-delay Examples

On the assumption that parameters of $o_L=0$ (dB) and $u_L=1$ (dB) and a relatively small step size for one type of antenna/channel configuration (e.g. smaller antenna spacing), if a 3-bit uniform quantization (second column in Table 1) in the above table is used, then a $CQI_{delta}$ value of 010 indicates a Delta SINR of $o_L + c \cdot u_L = 0 + 2*1 = 2$ dB and a then $CQI_{delta}$ value of 110 indicates a Delta SINR of 0+6*1=dB. For the same example, given the same large-delay CDD preceding parameters, when a 3-bit non-uniform B (i.e., fourth column in Table 1) is used instead, then the then a $CQI_{delta}$ value of 010 indicates a Delta SINR of 0+2*1=2 dB and a then $CQI_{delta}$ value of 110 indicates a Delta SINR of 0+8*1=8 dB.

On the assumption of $o_L=0$ (dB) and $u_L=1$ (dB) and a relatively small step size for one type of antenna/channel configuration (e.g. smaller antenna spacing), when a 3-bit uniform quantization (i.e., second column in Table 1) is employed, Table 2 shows a uniform example of resulting mapping between $CQI_{delta}$ and Delta SINR based on the above assumptions.

TABLE 2

Uniform example of mapping between $CQI_{delta}$ and Delta SINR for Large-delay CDD precoding schemes

| $CQI_{delta}$ | c (uniform) | Delta SINR (Uniform) |
|---|---|---|
| 000 | 0 | 0 dB |
| 001 | 1 | 1 dB |
| 010 | 2 | 2 dB |
| 011 | 3 | 3 dB |
| 100 | 4 | 4 dB |
| 101 | 5 | 5 dB |
| 110 | 6 | 6 dB |
| 111 | 7 | 7 dB |

In another large-delay CDD example with the parameters of $o_L=0$ (dB) and $u_L=2$ (dB) a slightly larger step size for another type of antenna/channel configuration (e.g. larger antenna spacing) is assumed, when a 3-bit uniform quantization (i.e., second column in Table 1) is employed, a $CQI_{delta}$ value 010 indicates a Delta SINR of $o_L + c \cdot u_L = 0 + 2*2 = 4$ dB and $CQI_{delta}$ value of 110 indicates a Delta SINR of 0+6*2=12 dB. Under the same assumptions, given the same large-delay CDD precoding parameters, when a 3-bit non-uniform B (i.e., fourth column in Table 1) is used instead, a $CQI_{delta}$ value of 010 indicates Delta SINR of 0+2*2=4 dB and $CQI_{delta}$ value of 110 indicates a Delta SINR of 0+8*2=16 dB.

Similarly, on the assumption that $o_L=0$ (dB) and $u_L=2$ (dB) and a three-bit non-uniform quantization (i.e., the third column of Table 1) is used, Table 3 may be constructed based on the above assumptions.

TABLE 3

Non-Uniform example of mapping between $CQI_{delta}$ and Delta SINR Large-delay CDD precoding schemes

| $CQI_{delta}$ | c (non-uniform A) | Delta SINR (non-Uniform A) |
|---|---|---|
| 000 | 0 | 0 dB |
| 001 | 2 | 4 dB |
| 010 | 4 | 8 dB |
| 011 | 5 | 10 dB |
| 100 | 6 | 12 dB |
| 101 | 7 | 14 dB |
| 110 | 9 | 18 dB |
| 111 | 11 | 22 dB |

2. Zero/Small-delay Examples

In a zero/small-delay CDD preceding example with the parameters of $o_S=-7$ (dB) and $u_S=2$ (dB), a relatively small step size for one type of antenna/channel configuration (e.g. smaller antenna spacing) is assumed. When a 3-bit uniform quantization (i.e., second column in Table 1) is used, a $CQI_{delta}$ value of 010 indicates a Delta SINR of $o_S + c \cdot u_S = -7 + 2*2 = -3$ dB and a then $CQI_{delta}$ value of 110 indicates a Delta SINR of $-7+6*2=5$ dB. Under the same assumptions, given the same large-delay CDD precoding parameters, when a 3-bit non-uniform A (i.e., the third column in Table 1) is used instead, a $CQI_{delta}$ value of 010 indicates a Delta SINR of $-7+4*2=1$ dB and $CQI_{delta}$ value of 110 indicates a Delta SINR of $-7+9*2=11$ dB.

In another zero/small-delay CDD precoding example with the parameters of $o_S=11$ (dB) and $u_S=3$ (dB), a relatively large step size for one type of antenna/channel configuration (e.g. larger antenna spacing) is assumed. When a 3-bit uniform quantization (i.e., second column in Table 1) in the above table is used, then a $CQI_{delta}$ value of 010 indicates a Delta SINR of $o_S + c \cdot u_S = -11 + 2*3 = -5$ dB and a then $CQI_{delta}$ value of 110 indicates a Delta SINR of $-11 + 6*3 = 7$ dB. Under the same assumptions, given the same large-delay CDD precoding parameters, if a 3-bit non-uniform A (third column in Table 1) is used instead, then the then a $CQI_{delta}$ value of 010 indicates a Delta SINR of $-11 + 4*3 = 1$ dB and a then $CQI_{delta}$ value of 110 indicates a Delta SINR of $-11 + 9*3 = 16$ dB.

Similarly, on the assumption that $o_S = -7$ (dB) and $u_S = 2$ (dB) and a three-bit non-uniform quantization (i.e., the third column of Table 1) is used, Table 4 may be constructed based on the above assumptions.

TABLE 4

Non-Uniform example of mapping between $CQI_{delta}$ and Delta SINR Zero/small-delay CDD precoding scheme

| $CQI_{delta}$ | c(non-uniform A) | Delta SINR (non-Uniform A) |
|---|---|---|
| 000 | 0 | −7 dB |
| 001 | 2 | −3 dB |
| 010 | 4 | 1 dB |
| 011 | 5 | 3 dB |
| 100 | 6 | 5 dB |
| 101 | 7 | 7 dB |
| 110 | 9 | 11 dB |
| 111 | 11 | 15 dB |

The user equipment (UE) creates the quantization tables (e.g., Tables, 2, 3 or 4) based on equation (2) or (3) and Table 1, and calculates the $CQI_{delta}$ by using the Delta SINR (delta signal to Interference plus noise ratio) and the created quantization table (e.g., Tables, 2, 3 or 4). The E-NodeB utilizes the created quantization tables and the feedback of $CQI_{delta}$ in order to calculate the quantized Delta SINR based on the quantization tables.

Tables 2-4 shows examples of quatization tables defining mapping method of the Delta SINR and $CQI_{delta}$. The present invention is not limited in these examples, however, on the contrary, is intended to cover various modifications and equivalent arrangements included within the spirit and scope of the appended claims, and equivalents thereof.

What is claimed is:

1. A method for data transmission, comprising the steps of:
at one of a plurality of user equipment within a cell comprising a base station and the plurality of user equipment, measuring first and second values respectively corresponding to one of two codewords defined in a multiple input multiple output (MIMO) data transmission system, and calculating a difference between a first measurement corresponding to the first measured value and a second measurement corresponding to the second measured value;
at the one of the plurality of user equipment, receiving a plurality of predetermined parameters determined at the base station, configuring a first quantization table defining a mapping between the difference and a delta channel quality information (CQI) indicator carrying channel quality information upon reception of the plurality of predetermined parameters, and determining the value of the delta CQI indicator based on the calculated difference and the configured first quantization table; and
at the one of the plurality of user equipment, transmitting the determined delta CQI indicator to the base station.

2. The method of claim 1, further comprising a step of determining, at the user equipment, a value of a base CQI indicator carrying the channel quality information based on one of the first and second measurements and a second quantization table defining a mapping between one of the first and second measurements and the value of the delta CQI indicator upon the completion of measurement of the first and second measurements.

3. The method of claim 1, with the plurality of predetermined parameters comprising a configurable step size value and a configurable offset value.

4. The method of claim 3, with the configurable step size value and the configurable offset value set for a small/zero delay cyclic delay diversity scheme has a predetermined relationship with the configurable step size value and the configurable offset value set for a large delay cyclic delay diversity scheme.

5. The method of claim 4, with the configurable step size value set for the small/zero delay cyclic delay diversity scheme being equal to the configurable step size value set for the large delay cyclic delay diversity scheme.

6. The method of claim 4, with the configurable step size value set for the small/zero delay cyclic delay diversity scheme being two times the configurable step size value set for the large delay cyclic delay diversity scheme.

7. The method of claim 3, with the plurality of predetermined parameters being broadcasted from the base station to the plurality of user equipment.

8. The method of claim 3, with the plurality of predetermined parameters being semi-statically configured and being selectively transmitted from the base station to one of the plurality of user equipment by using a radio resource control (RRC) message.

9. The method of claim 1, with the first and second measurements being a first signal to interference plus noise ratio (SINR) and a second SINR respectively.

10. The method of claim 9, with the plurality of predetermined parameters further comprising a configurable step size value and a configurable offset value.

11. The method of claim 10, with the configured first quantization table being determined by a mapping method between the difference and the plurality of predetermined parameters and with the mapping method being described by:

Delta SINR=$o + c \times u$, where the variable Delta SINR is the delta measurement, the variable o is the configurable offset value, the variable u is the configurable step size value and the variable c is a value of a predetermined intermediate variable having a predetermined relationship with the received delta CQI.

12. The method of claim 11, with the value of the predetermined intermediate variable increasing by a predetermined constant step size while the value of the delta CQI indicator increases.

13. The method of claim 11, in which the value of the predetermined intermediate variable increases with a first predetermined step size when the value of the delta CQI indicator increases within a first range; the value of the predetermined intermediate variable increases with a second predetermined step size when the value of the delta CQI indicator increases within a second range; and the value of the predetermined intermediate variable increases with a third predetermined step size when the value of the delta CQI indicator increases within a third range, with the first predetermined step size and the third predetermined step size being greater than the second step size and with the values of the delta CQI indicator within the second range being less than the values of the delta CQI indicator within the third range and greater than the values of the delta CQI indicator within the first range.

14. The method of claim 11, in which the value of intermediate variable increases by a fourth predetermined step size when the value of the delta CQI indicator increases within a fourth range; the value of intermediate variable increases by a fifth predetermined step size when the value of the delta CQI indicator increases within a fifth range, with the fourth predetermined step size being less than the fifth step size and with the values of the delta CQI indicator within the fourth range being less than the values of the delta CQI indicator within the fifth range.

15. The method of claim 9, with the first SINR and the second SINR being a wide-band SINRs which are averaged over more than one subcarrier in a frequency domain.

16. The method of claim 9, with the first SINR and the second SINR being wide-band SINRs which are averaged over one subcarrier in the frequency domain.

17. A method for data transmission, comprising the steps of:
at a base station within a cell comprising a base station and a plurality of user equipment, receiving a delta channel quality information (CQI) indicator and a first CQI both carrying the channel quality information transmitted from one of the plurality of user equipment,
at the base station, determining a difference between a first quantized value and a second quantized value respectively corresponding to one of two codewords defined in a multiple input multiple output (MIMO) data transmission system, based on the received delta CQI indicator and a first quantization table constructed by the one of the plurality of user equipment, with the first quantization table defining a mapping between the difference and the delta CQI indicator; and
at the base station, transmitting the determined difference to the one of the plurality of user equipment.

18. The method of claim 17, further comprising a step of determining, at the base station, the first quantized value corresponding to one of the two codewords based on the received first CQI indicator and a second quantization table defining a mapping between the first quantized value and the first CQI indicator.

19. The method of claim 17, with the quantized first and second measurements being a first quantized signal to interference plus noise ratio (SINR) and a second quantized SINR respectively.

* * * * *